US012557956B2

(12) United States Patent
Camplani et al.

(10) Patent No.: US 12,557,956 B2
(45) Date of Patent: Feb. 24, 2026

(54) VACUUM CLEANER

(71) Applicant: Dyson Technology Limited, Wiltshire (GB)

(72) Inventors: Massimo Camplani, Bristol (GB); Andrew Collingwood Watson, Gloucester (GB); David Alan Millington, Swindon (GB); Nathan Lawson Mclean, Bristol (GB)

(73) Assignee: Dyson Technology Limited, Malmesbury (GB)

( * ) Notice: Subject to any disclaimer, the term of this patent is extended or adjusted under 35 U.S.C. 154(b) by 453 days.

(21) Appl. No.: 18/014,658

(22) PCT Filed: Jun. 3, 2021

(86) PCT No.: PCT/GB2021/051375
§ 371 (c)(1),
(2) Date: Jan. 5, 2023

(87) PCT Pub. No.: WO2022/008871
PCT Pub. Date: Jan. 13, 2022

(65) Prior Publication Data
US 2023/0248197 A1 Aug. 10, 2023

(30) Foreign Application Priority Data
Jul. 10, 2020 (GB) ..................................... 2010659

(51) Int. Cl.
*A47L 9/28* (2006.01)
*G01C 21/16* (2006.01)
(52) U.S. Cl.
CPC ........... *A47L 9/2842* (2013.01); *A47L 9/2826* (2013.01); *A47L 9/2831* (2013.01); *G01C 21/16* (2013.01)

(58) Field of Classification Search
CPC .... A47L 9/2842; A47L 9/2826; A47L 9/2831; G01C 21/16
See application file for complete search history.

(56) References Cited

U.S. PATENT DOCUMENTS

| | | | |
|---|---|---|---|
| 5,722,109 | A | 3/1998 | Delmas et al. |
| 2002/0083548 | A1 | 7/2002 | Hansen |

(Continued)

FOREIGN PATENT DOCUMENTS

| | | |
|---|---|---|
| CN | 103239191 A | 8/2013 |
| CN | 105892457 A | 8/2016 |

(Continued)

OTHER PUBLICATIONS

International Search Report and Written Opinion received for PCT Patent Application No. PCT/GB2021/051373, mailed on Sep. 10, 2021, 12 pages.

(Continued)

*Primary Examiner* — Andrew A Horton
(74) *Attorney, Agent, or Firm* — Tucker Ellis LLP

(57) ABSTRACT

A vacuum cleaner includes: a sensor configured to generate sensor signals based on sensed motion and orientation of the vacuum cleaner; a vacuum motor; and a controller configured to: process the generated sensor signals to determine a type of cleaning activity being performed by a user using the vacuum cleaner; and in response to determining that the type of cleaning activity includes cleaning a surface at least partially obstructed by an object, decrease the power of the vacuum motor.

21 Claims, 12 Drawing Sheets

(56) References Cited

U.S. PATENT DOCUMENTS

| | | |
|---|---|---|
| 2002/0112315 A1 | 8/2002 | Conrad |
| 2005/0166354 A1 | 8/2005 | Naoya |
| 2009/0271944 A1 | 11/2009 | Lovelass |
| 2011/0232687 A1 | 9/2011 | Stein |
| 2015/0264121 A1 | 9/2015 | Van Biljon et al. |
| 2015/0265121 A1 | 9/2015 | Kim et al. |
| 2016/0073844 A1 | 3/2016 | Park |
| 2016/0235270 A1 | 8/2016 | Santini |
| 2018/0000304 A1 | 1/2018 | Zhong et al. |
| 2018/0008112 A1 | 1/2018 | Ham et al. |
| 2019/0216282 A1 | 7/2019 | Pohlman et al. |
| 2019/0387943 A1* | 12/2019 | Kim ..................... A47L 9/2842 |
| 2020/0069134 A1 | 3/2020 | Ebrahimi Afrouzi et al. |
| 2021/0393097 A1 | 12/2021 | King et al. |
| 2023/0248198 A1 | 8/2023 | Camplani et al. |
| 2023/0255421 A1 | 8/2023 | Camplani et al. |
| 2023/0255422 A1 | 8/2023 | Camplani et al. |
| 2023/0255423 A1 | 8/2023 | Camplani et al. |
| 2023/0255425 A1 | 8/2023 | Camplani et al. |
| 2023/0263347 A1 | 8/2023 | Camplani et al. |
| 2023/0263354 A1 | 8/2023 | Camplani et al. |
| 2023/0263355 A1 | 8/2023 | Camplani et al. |

FOREIGN PATENT DOCUMENTS

| | | |
|---|---|---|
| CN | 106175599 A | 12/2016 |
| CN | 107920705 A | 4/2018 |
| CN | 108670119 A | 10/2018 |
| CN | 109691931 A | 4/2019 |
| CN | 111031874 A | 4/2020 |
| DE | 102014113796 A1 | 3/2016 |
| DE | 102015108464 A1 | 12/2016 |
| DE | 102018200691 A1 | 7/2019 |
| EP | 2682034 A2 | 1/2014 |
| EP | 3058860 A1 | 8/2016 |
| EP | 3162266 A1 | 5/2017 |
| EP | 3263004 A1 | 1/2018 |
| EP | 3278698 A1 | 2/2018 |
| GB | 2490256 A | 10/2012 |
| GB | 2572433 A | 10/2019 |
| GB | 2578872 A | 6/2020 |
| JP | H04-250128 A | 9/1992 |
| JP | H05-130960 A | 5/1993 |
| JP | 05-269063 A | 10/1993 |
| JP | H05-253152 A | 10/1993 |
| JP | H06154139 A | 6/1994 |
| JP | 2009-172235 A | 8/2009 |
| JP | 2010-115360 A | 5/2010 |
| JP | 2011-188963 A | 9/2011 |
| JP | 2012-101060 A | 5/2012 |
| JP | 2012-148011 A | 8/2012 |
| JP | 2013-198702 A | 10/2013 |
| JP | 2013-202094 A | 10/2013 |
| JP | 2015-521945 A | 8/2015 |
| JP | 2015-156900 A | 9/2015 |
| JP | 2015-165835 A | 9/2015 |
| JP | 2016-022378 A | 2/2016 |
| JP | 2017-080410 A | 5/2017 |
| JP | 2018-101444 A | 6/2018 |
| JP | 2019-111321 A | 7/2019 |
| KR | 20180082025 A | 7/2018 |
| KR | 20190089795 A | 7/2019 |
| KR | 20200009680 A | 1/2020 |
| WO | 2012/077621 A1 | 6/2012 |
| WO | 2018/202367 A1 | 11/2018 |
| WO | 2020/106420 A1 | 5/2020 |

OTHER PUBLICATIONS

International Search Report and Written Opinion received for PCT Patent Application No. PCT/GB2021/051369, mailed on Aug. 31, 2021, 12 pages.

International Search Report and Written Opinion received for PCT Patent Application No. PCT/GB2021/051370, mailed on Aug. 30, 2021, 10 pages.

International Search Report and Written Opinion received for PCT Patent Application No. PCT/GB2021/051371, mailed on Sep. 9, 2021, 13 pages.

International Search Report and Written Opinion received for PCT Patent Application No. PCT/GB2021/051372, mailed on Aug. 30, 2021, 10 pages.

International Search Report and Written Opinion received for PCT Patent Application No. PCT/GB2021/051374, mailed on Aug. 31, 2021, 12 pages.

International Search Report and Written Opinion received for PCT Patent Application No. PCT/GB2021/051375, mailed on Sep. 1, 2021, 11 pages.

International Search Report and Written Opinion received for PCT Patent Application No. PCT/GB2021/051376, mailed on Sep. 7, 2021, 11 pages.

International Search Report and Written Opinion received for PCT Patent Application No. PCT/GB2021/051509, mailed on Sep. 17, 2021, 11 pages.

Search Report received for GB Application No. 2010656.3, mailed on Jan. 5, 2021, 1 page.

Search Report received for GB Application No. 2010659.7, mailed on Jan. 5, 2021, 1 page.

Examination Report received for GB Application No. 2305861.3, mailed on Nov. 13, 2023, 1 page.

* cited by examiner

VACUUM CLEANER

CROSS-REFERENCE TO PRIOR APPLICATION

This application is a § 371 National Stage Application of PCT International Application No. PCT/GB2021/051375 filed Jun. 3, 2021, which claims the priority of United Kingdom Application No. 2010659.7, filed Jul. 10, 2020, each of which are herein incorporated by reference in their entirety.

TECHNICAL FIELD

The present disclosure relates to a vacuum cleaner. In particular, but not exclusively, the present disclosure concerns measures, including methods, apparatus and computer programs, for operating a vacuum cleaner.

BACKGROUND

Broadly speaking, there are four types of vacuum cleaner: 'upright' vacuum cleaners, 'cylinder' vacuum cleaners (also referred to as 'canister' vacuum cleaners), 'handheld' vacuum cleaners and 'stick' vacuum cleaners.

Upright vacuum cleaners and cylinder vacuum cleaners tend to be mains-power-operated.

Handheld vacuum cleaners are relatively small, highly portable vacuum cleaners, suited particularly to relatively low duty applications such as spot cleaning floors and upholstery in the home, interior cleaning of cars and boats etc. Unlike upright cleaners and cylinder cleaners, they are designed to be carried in the hand during use, and tend to be powered by battery.

Stick vacuum cleaners may comprise a handheld vacuum cleaner in combination with a rigid, elongate suction wand which effectively reaches down to the floor so that the user may remain standing while cleaning a floor surface. A floor tool is typically attached to the end of the rigid, elongate suction wand, or alternatively may be integrated with the bottom end of the wand.

Stick vacuum cleaners can typically be operated at varying power levels of the vacuum motor to suit different cleaning activities. These typically include a low power mode (or 'eco' mode), a default power mode and a high power mode (or 'boost' mode). The vacuum cleaner typically operates in the default power mode when it is initially switched on. The user may then set other desired power levels manually. However, this can sometimes result in the chosen power level being sub-optimal in terms of cleaning performance or battery life.

It is an object of the present disclosure to mitigate or obviate the above disadvantages, and/or to provide an improved or alternative vacuum cleaner.

SUMMARY

According to an aspect of the present disclosure, there is provided a vacuum cleaner comprising: a sensor configured to generate sensor signals based on sensed motion and orientation of the vacuum cleaner; a vacuum motor; and a controller configured to: process the generated sensor signals to determine a type of cleaning activity being performed by a user using the vacuum cleaner; and in response to determining that the type of cleaning activity comprises cleaning a surface at least partially obstructed by an object, decrease the power of the vacuum motor.

Decreasing the power of the vacuum motor when the user is cleaning a surface at least partially obstructed by an object provides the advantage that the manoeuvrability of the vacuum cleaner is improved. This is because the force required to move the cleaner head, for example, across the surface will be reduced when the power of the vacuum motor is decreased.

In embodiments, the surface at least partially obstructed by an object comprises a surface under or behind the object.

In embodiments, the object comprises an item of furniture or an appliance.

In embodiments, the controller is configured to decrease the power of the vacuum motor by setting the power of the vacuum motor to a value less than a pre-determined value.

In embodiments, the pre-determined value corresponds to a default power of the vacuum motor.

In embodiments, the controller is configured to set the power of the vacuum motor to the default power when the vacuum cleaner is initially switched on.

In embodiments, the sensor signals are based only on sensed motion of the vacuum cleaner or only on sensed orientation of the vacuum cleaner.

In embodiments, the sensor comprises an inertial measurement unit, IMU.

In embodiments, the vacuum cleaner further comprises: a cleaner head comprising an agitator; and one or more diagnostic sensors configured to generate further sensor signals based on sensed parameters of the cleaner head, wherein the controller is configured to process the generated further sensor signals to determine the type of cleaning activity being performed by the user using the vacuum cleaner. In this manner, when additional sensors are available, the additional sensor data are used by the controller to determine the cleaning activity being undertaken. This may improve the accuracy and/or speed at which the cleaning activity is determined.

In embodiments, the cleaner head further comprises an agitator motor arranged to rotate the agitator and the sensed parameters of the cleaner head comprise the agitator motor current.

In embodiments, the sensed parameters of the cleaner head comprise the pressure applied to the cleaner head.

In embodiments, the controller is configured to process the sensor signals by performing a pre-processing step and a classification step.

In embodiments, the pre-processing step comprises extracting features from time portions of the sensor signals.

In embodiments, the pre-processing step comprises filtering the sensor signals.

In embodiments, the classification step comprises processing the extracted features using a machine learning classifier. Advantageously, a machine learning classifier can be pre-trained, for example at the factory, by subjecting the vacuum cleaner to a multitude of different cleaning activities/scenarios and defining how the vacuum cleaner should respond in each case. Furthermore, the machine learning classifier may be capable of further learning in the user's home environment.

In embodiments, the machine learning classifier comprises one or more of: an artificial neural network, a random forest and a support-vector machine.

According to an aspect of the present disclosure, there is provided a method of controlling the power of a vacuum cleaner, the method comprising: generating sensor signals based on sensed motion and orientation of the vacuum cleaner; processing the sensor signals to determine a type of cleaning activity being performed by a user using the vacuum cleaner; and in response to determining that the type of cleaning activity comprises cleaning a surface at least partially obstructed by an object, decreasing the power of the vacuum cleaner.

According to an aspect of the present disclosure, there is provided a computer program comprising a set of instructions, which, when executed by a computerised device, cause the computerised device to perform a method of controlling the power of a vacuum cleaner, the method comprising: generating sensor signals based on sensed motion and orientation of the vacuum cleaner; processing the sensor signals to determine a type of cleaning activity being performed by a user using the vacuum cleaner; and in response to determining that the type of cleaning activity comprises cleaning a surface at least partially obstructed by an object, decreasing the power of the vacuum cleaner.

According to an aspect of the present disclosure, there is provided a vacuum cleaner comprising: a sensor configured to generate sensor signals based on sensed motion and orientation of the vacuum cleaner; a vacuum motor; and a controller configured to: process the generated sensor signals to determine a type of cleaning activity being performed by a user using the vacuum cleaner; and in response to determining that the type of cleaning activity comprises stair cleaning, decrease the power of the vacuum motor.

Decreasing the power of the vacuum motor when the user is cleaning stairs provides the advantage that the manoeuvrability of the vacuum cleaner is improved. This is because the force required to move the cleaner head, for example, across the stairs will be reduced when the power of the vacuum motor is decreased. This is beneficial when cleaning stairs because if the cleaner head were to stick to the stair surface due to high suction, this could result in a potentially dangerous situation whereby the user would be required to apply excessive force to lift the cleaner head off the stairs.

In embodiments, the controller is configured to decrease the power of the vacuum motor by setting the power of the vacuum motor to a value less than a pre-determined value.

In embodiments, the pre-determined value corresponds to a default power of the vacuum motor.

In embodiments, the controller is configured to set the power of the vacuum motor to the default power when the vacuum cleaner is initially switched on.

In embodiments, the sensor signals are based only on sensed motion of the vacuum cleaner or only on sensed orientation of the vacuum cleaner.

In embodiments, the sensor comprises an inertial measurement unit, IMU.

In embodiments, the vacuum cleaner further comprises: a cleaner head comprising an agitator; and one or more diagnostic sensors configured to generate further sensor signals based on sensed parameters of the cleaner head, wherein the controller is configured to process the generated further sensor signals to determine the type of cleaning activity being performed by the user using the vacuum cleaner. In this manner, when additional sensors are available, the additional sensor data are used by the controller to determine the cleaning activity being undertaken. This may improve the accuracy and/or speed at which the cleaning activity is determined.

In embodiments, the cleaner head further comprises an agitator motor arranged to rotate the agitator and the sensed parameters of the cleaner head comprise the agitator motor current.

In embodiments, the sensed parameters of the cleaner head comprise the pressure applied to the cleaner head.

In embodiments, the controller is configured to process the sensor signals by performing a pre-processing step and a classification step.

In embodiments, the pre-processing step comprises extracting features from time portions of the sensor signals.

In embodiments, the pre-processing step comprises filtering the sensor signals.

In embodiments, the classification step comprises processing the extracted features using a machine learning classifier. Advantageously, a machine learning classifier can be pre-trained, for example at the factory, by subjecting the vacuum cleaner to a multitude of different cleaning activities/scenarios and defining how the vacuum cleaner should respond in each case. Furthermore, the machine learning classifier may be capable of further learning in the user's home environment.

In embodiments, the machine learning classifier comprises one or more of: an artificial neural network, a random forest and a support-vector machine.

According to an aspect of the present disclosure, there is provided a method of controlling the power of a vacuum cleaner, the method comprising: generating sensor signals based on sensed motion and orientation of the vacuum cleaner; processing the sensor signals to determine a type of cleaning activity being performed by a user using the vacuum cleaner; and in response to determining that the type of cleaning activity comprises stair cleaning, decreasing the power of the vacuum cleaner.

According to an aspect of the present disclosure, there is provided a computer program comprising a set of instructions, which, when executed by a computerised device, cause the computerised device to perform a method of controlling the power of a vacuum cleaner, the method comprising: generating sensor signals based on sensed motion and orientation of the vacuum cleaner; processing the sensor signals to determine a type of cleaning activity being performed by a user using the vacuum cleaner; and in response to determining that the type of cleaning activity comprises stair cleaning, decreasing the power of the vacuum cleaner.

According to an aspect of the present disclosure, there is provided a vacuum cleaner comprising: a sensor configured to generate sensor signals based on sensed motion and orientation of the vacuum cleaner; a vacuum motor; and a controller configured to: process the generated sensor signals to determine a type of cleaning activity being performed by a user using the vacuum cleaner; and in response to determining that the type of cleaning activity comprises making repeated forward and reverse strokes, the controller is configured to set the power of the vacuum motor for the forward strokes to be greater than the power for the reverse strokes.

It has been appreciated that pickup of dirt from a surface tends to be less efficient on reverse strokes than on forward strokes, due to a number of factors. Advantageously, by setting the vacuum motor power for the forward strokes to be greater than the vacuum power for the revere strokes, the vacuum cleaner is optimized for the more-efficient forward strokes, whilst conserving battery power by reducing the vacuum motor power on the less-efficient reverse strokes. This enables the runtime of a battery operated vacuum cleaner to be improved without sacrificing, or actually improving, cleaning performance.

According to an aspect of the present disclosure, there is provided a method of controlling the power of a vacuum cleaner, the method comprising: generating sensor signals based on sensed motion and orientation of the vacuum cleaner; processing the sensor signals to determine a type of cleaning activity being performed by a user using the vacuum cleaner; and in response to determining that the type of cleaning activity comprises making repeated forward and reverse strokes, the controller is configured to set the power of the vacuum motor for the forward strokes to be greater than the power for the reverse strokes.

According to an aspect of the present disclosure, there is provided a computer program comprising a set of instructions, which, when executed by a computerised device, cause the computerised device to perform a method of controlling the power of a vacuum cleaner, the method comprising: generating sensor signals based on sensed motion and orientation of the vacuum cleaner; processing the sensor signals to determine a type of cleaning activity being performed by a user using the vacuum cleaner; and in response to determining that the type of cleaning activity comprises making repeated forward and reverse strokes, the controller is configured to set the power of the vacuum motor for the forward strokes to be greater than the power for the reverse strokes.

The present disclosure is not limited to any particular type of vacuum cleaner. For example, the aspects of the disclosure may be utilised on upright vacuum cleaners, cylinder vacuum cleaners or handheld or 'stick' vacuum cleaners.

It should be appreciated that features described in relation to one aspect of the present disclosure may be incorporated into other aspects of the present disclosure. For example, a method aspect may incorporate any of the features described with reference to an apparatus aspect and vice versa.

DESCRIPTION OF THE DRAWINGS

Embodiments of the present disclosure will now be described by way of example only with reference to the accompanying schematic drawings of which.

6

DETAILED DESCRIPTION

Figure 1:
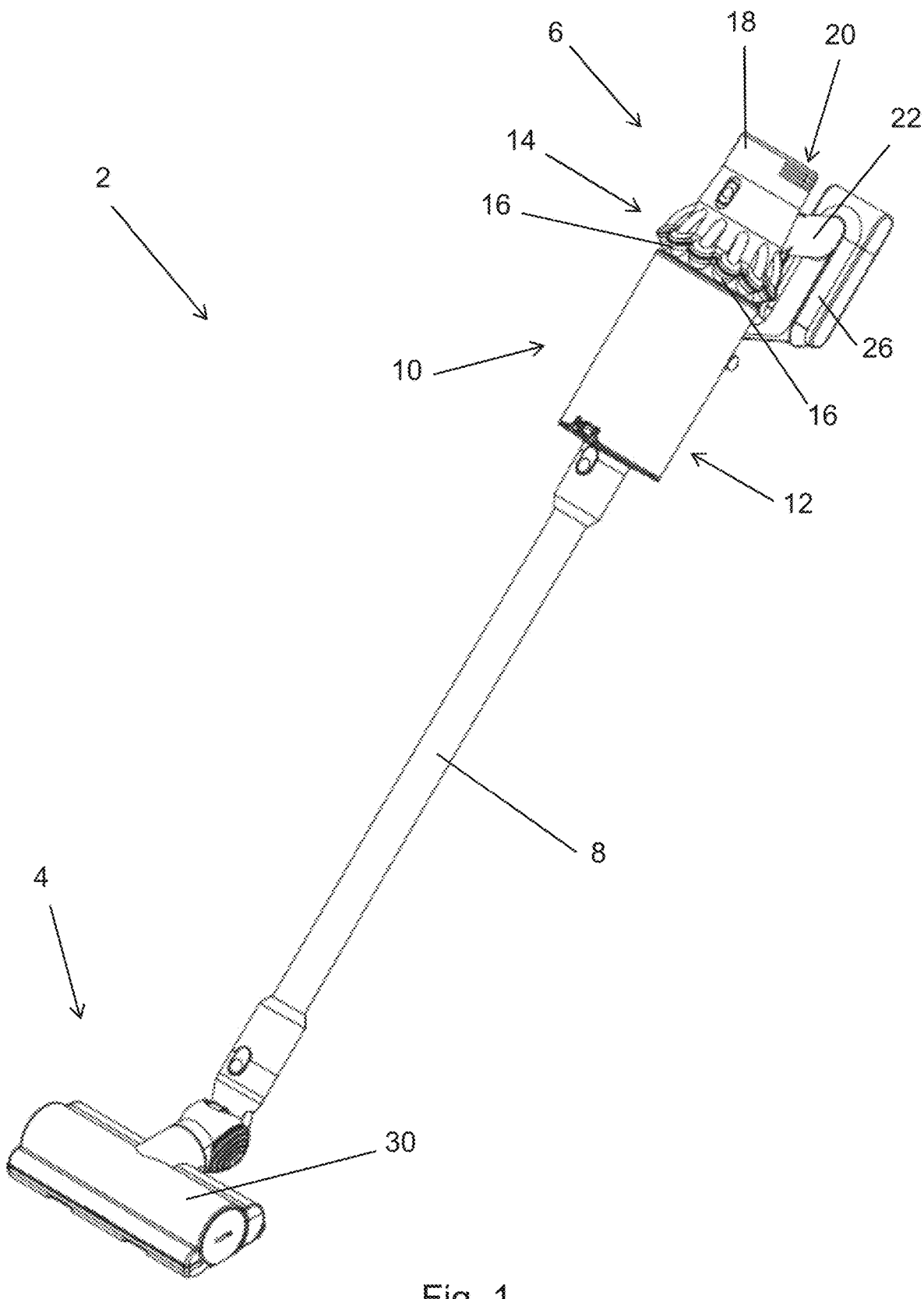
FIG. 1 is a perspective view of a stick vacuum cleaner according to an embodiment of the present disclosure.

FIGS. 1 to 4 illustrate a vacuum cleaner 2 according to embodiments of the present disclosure. The vacuum cleaner 2 is a 'stick' vacuum cleaner comprising a cleaner head 4 connected to a main body 6 by a generally tubular elongate wand 8. The cleaner head 4 is also connectable directly to the main body 6 to transform the vacuum cleaner 2 into a handheld vacuum cleaner. Other removable tools, such as a crevice tool 3, a dusting brush 7 and a miniature motorized cleaner head 5 may be attached directly to the main body 6, or to the end of the elongate wand 8, to suit different cleaning tasks.

The main body 6 comprises a dirt separator 10 which in this case is a cyclonic separator. The cyclonic separator has a first cyclone stage 12 comprising a single cyclone, and a second cyclone stage 14 comprising a plurality of cyclones 16 arranged in parallel. The main body 6 also has a removable filter assembly 18 provided with vents 20 through which air can be exhausted from the vacuum cleaner 2. The main body 6 of the vacuum cleaner 2 has a pistol grip 22 positioned to be held by the user. At an upper end of the pistol grip 22 is a user input device in the form of a trigger switch 24, which is usually depressed in order to switch on the vacuum cleaner 2. However, in some embodiments the physical trigger switch 24 is optional. Positioned beneath a lower end of the pistol grip 22 is a battery pack 26 which comprises a plurality of rechargeable cells 27. A controller 50 and a vacuum motor 52, comprising a fan driven by an electric motor, are provided in the main body 6 behind the dirt separator 10.

Figure 2:
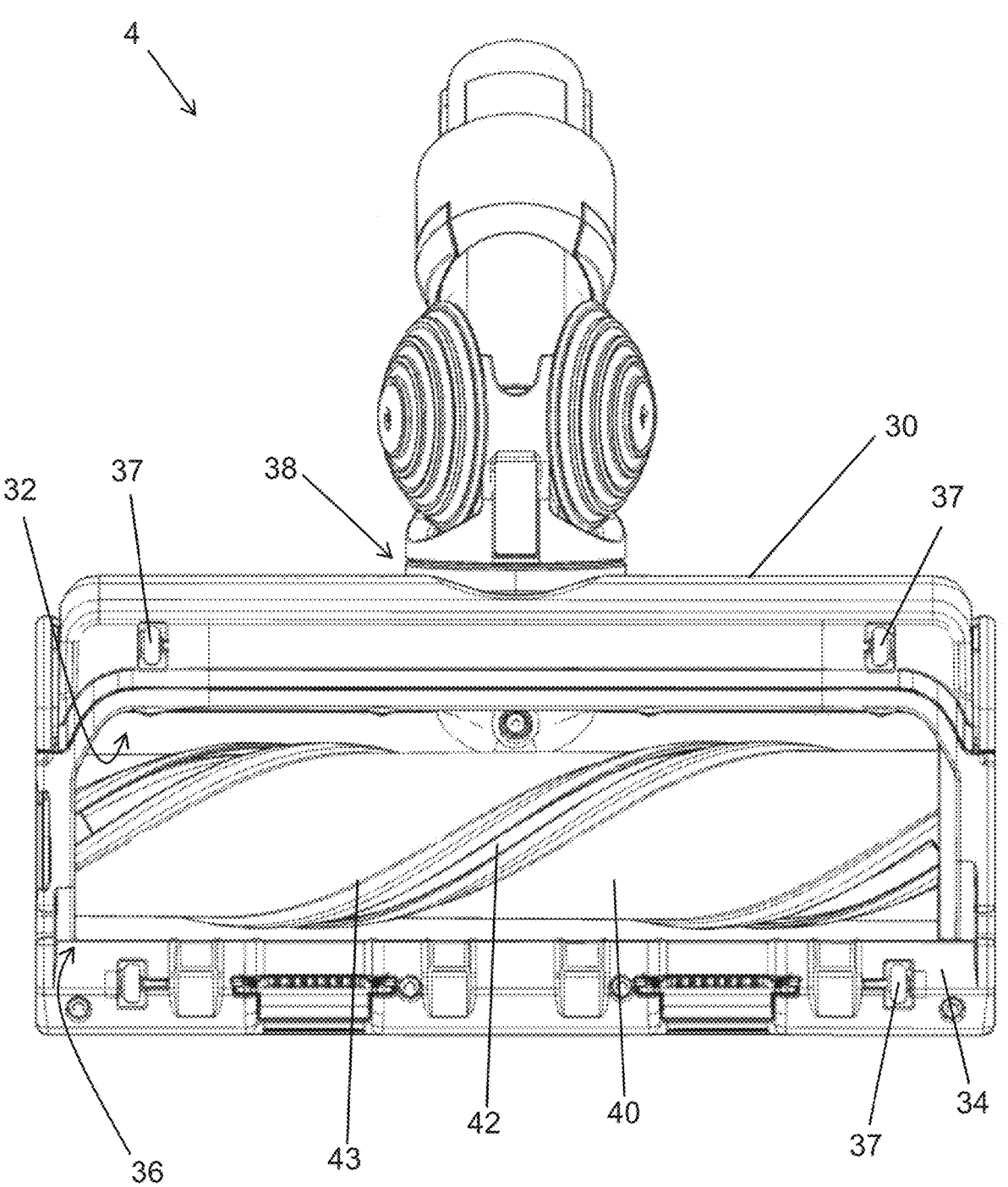
FIG. 2 is a view of a cleaner head of the vacuum cleaner of FIG. 1, shown from underneath.

The cleaner head 4 is shown from underneath in FIG. 2. The cleaner head 4 has a casing which defines a suction chamber 32 and a soleplate 34. The soleplate 34 has a suction opening 36 through which air can enter the suction chamber 32, and wheels 37 for engaging a floor surface. The casing 30 defines an outlet 38 through which air can pass from the suction chamber 32 into the wand 8. Positioned inside the suction chamber 32 is an agitator 40 in the form of a brush bar. The agitator 40 can be driven to rotate inside the suction chamber 32 by an agitator motor 54. The agitator motor 54 of this embodiment is received inside the agitator 40. The agitator 40 has helical arrays of bristles 43 projecting from grooves 42, and is positioned in the suction chamber such that the bristles 43 project out of the suction chamber 34 through the suction opening 36.

Figure 3:
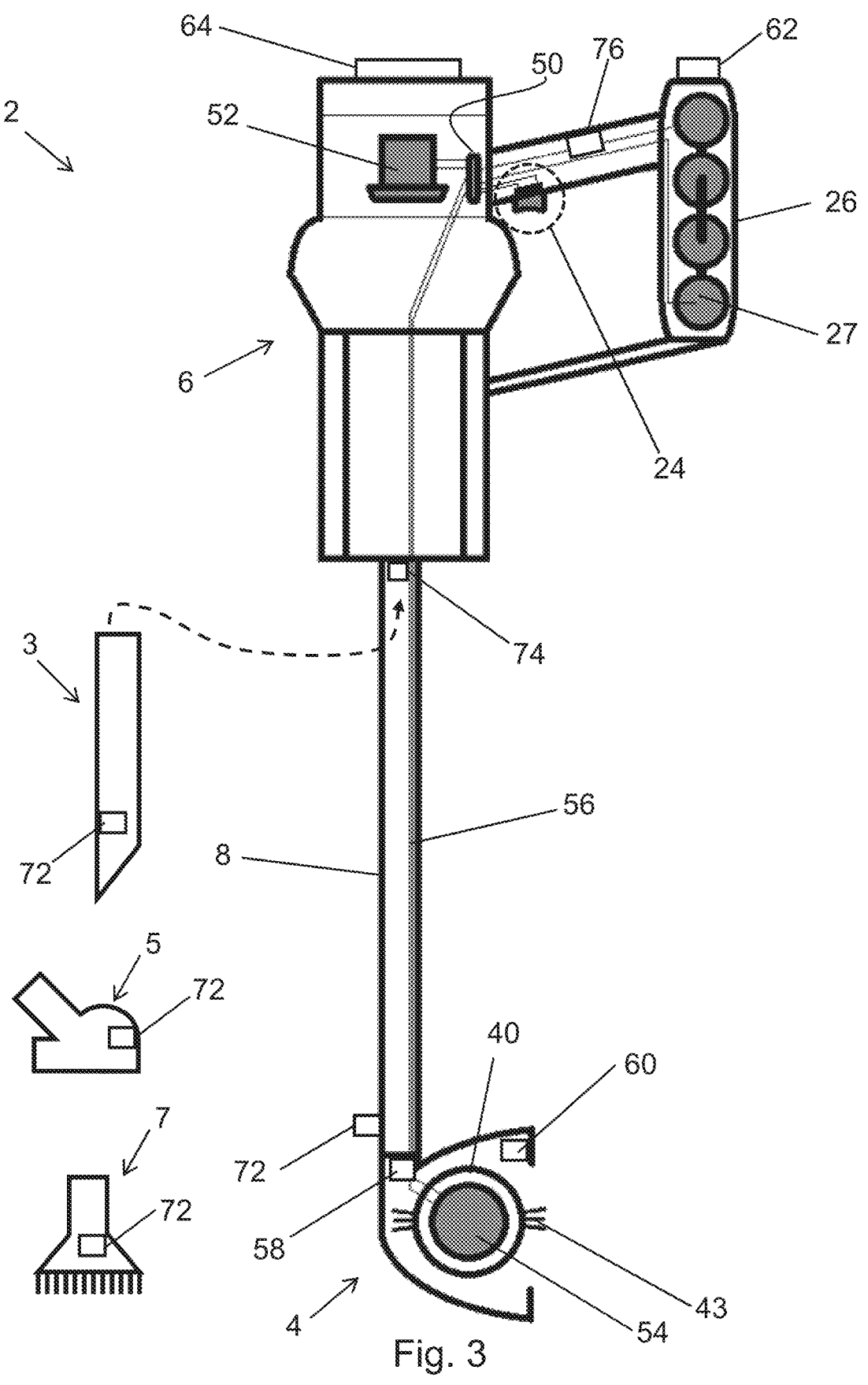
FIG. 3 is a schematic illustration of electrical components of the vacuum cleaner of FIG. 1.

FIG. 3 is a schematic representation of the electrical components of the vacuum cleaner 2. The controller 50 manages the supply of electrical power from the cells 27 of the battery pack 26 to the vacuum motor 52. When the vacuum motor 52 is powered on, this creates a flow of air so as to generate suction. Air with dirt entrained therein is sucked into the cleaner head 4 (or, when attached, one of the other tools such as the crevice tool 3, the mini motorised cleaner head 5, or the dusting brush 7), into the suction chamber 32 through the suction opening 36. From there, the air is sucked through the outlet 38 of the cleaner head 4, along the wand 8 and into the dirt separator 10. Entrained dirt is removed by the dirt separator 10 and then relatively clean air is drawn through the vacuum motor 52, through the filter assembly 18 and out of the vacuum cleaner 2 through the vents 20. In addition, the controller 50 also supplies electrical power from the battery pack 26 to the agitator motor 54 of the cleaner head 4, through wires 56 running along the inside of the wand, so as to rotate the agitator 40. When the cleaner head 4 is on a hard floor, it is supported by the wheels 37 and the soleplate 34 and agitator 40 are spaced apart from the floor surface. When the cleaner head 4 is resting on a carpeted surface, the wheels 37 sink into the pile of the carpet and the soleplate 34 (along with the rest of the cleaner head 4) is therefore positioned further down. This allows carpet fibres to protrude towards (and potentially through) the suction opening 36, whereupon they are disturbed by bristles 43 of the rotating agitator 40 so as to loosen dirt and dust therefrom.

Figure 4:
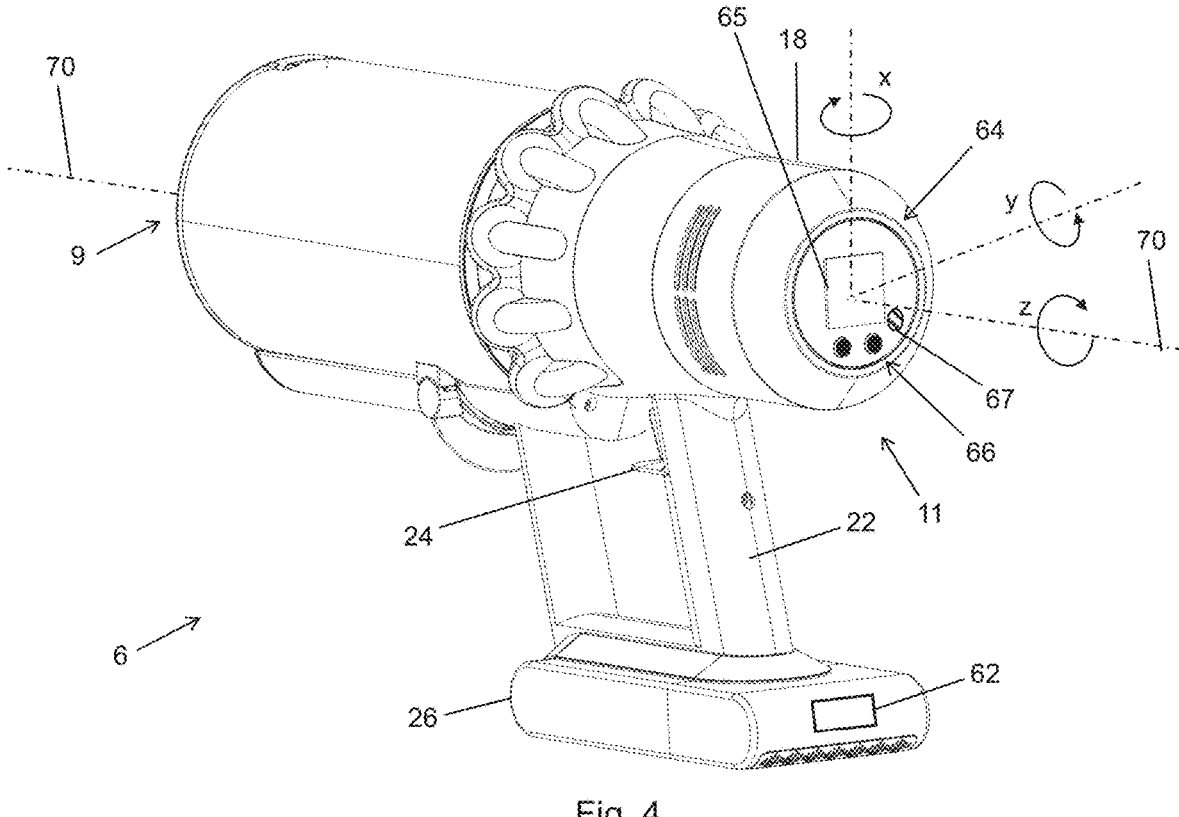
FIG. 4 is a perspective view of a main body of the stick vacuum cleaner of FIG. 1.

Vacuum cleaners 2 according to embodiments of the present disclosure comprise additional components, which are visible in FIGS. 3 and 4. These include one or more of: a current sensor 58 for sensing the electrical current drawn by the agitator motor 54 of the cleaner head 4, a pressure sensor 60 for sensing the pressure applied to the soleplate 34 of the cleaner head 4, an inertial measurement unit (IMU) 62 which is sensitive to motion and orientation of the main body 6 of the vacuum cleaner 2, a human computer interface (HCI) 64, one or more proximity sensors, typically in the form of time of flight (TOF) sensors 72, a tool switch sensor 74 and a capacitive sensor 76 located in the pistol grip 22. Although the current sensor 58 is shown as being situated in the cleaner head 4, it could alternatively be located in the main body 6. For example, the current sensor 58 could be integrated as part of the controller 50, provided it is operable to sense electrical current supplied to the agitator motor 54 from the battery 26 via the wires 56. In the illustrated embodiment, one TOF sensor 72 is located at the end of the detachable wand 8, close to where the cleaner head 4, or one of the other tools 3, 5, 7, is attached. Further TOF sensors 72 may be provided on the removable tools 3, 5, 7 themselves. Each TOF sensor 72 generates a sensor signal dependent on the proximity of objects to the TOF sensor 72. Suitable TOF sensors 72 include radar or laser devices. The tool switch sensor 74 is located on the main body 6 of the vacuum cleaner 2 and generates signals dependent on whether a tool 3, 4, 5, 7 or the wand 8 is attached to the main body 6. In embodiments, the tool switch sensor 74 generates signals dependent on the type of tool 3, 4, 5, 7 attached to main body 6 or the wand 8. The capacitive sensor 76 is located in the pistol grip 22 and generates signals dependent on whether a user is gripping the pistol grip. In embodiments, the vacuum cleaner 2 may comprise one or more additional IMUs. For example, the cleaner head 4 may comprise an IMU which is sensitive to motion and orientation of the cleaner head 4 and which generates further sensor signals to supplement those generated by the IMU 62 of the main body 6. The IMU 62 may comprise one or more accelerometers, one or more gyroscopes and/or one or more magnetometers.

As shown in more detail in FIG. 4, the main body 6 of the vacuum cleaner 2 defines a longitudinal axis 70 which runs from a front end 9 to a rear end 11 of the main body 6. When it is attached to the front end 9 of the main body 6, the wand 8 is parallel to (and in this case collinear with) the longitudinal axis 70. In the illustrated embodiment, the HCI 64 comprises a visual display unit 65, more particularly a planar, full colour, backlit thin-film transistor (TFT) screen. The screen 65 is controlled by the controller 50 and receives power from the battery 26. The screen displays information to the user, such as an error message, an indication of a mode the vacuum cleaner 2 is operating in, or an indication of remaining battery 26 life. The screen 65 faces substantially rearwards (i.e. its plane is orientated substantially normal to the longitudinal axis 70). Positioned beneath the screen 65 (in the vertical direction defined by the pistol grip 22) is a pair of control members 66, also forming part of the HCI 64 and each of which is positioned adjacent to the screen 65 and is configured to receive a control input from the user. In embodiments, the control members are configured to change the mode of the vacuum cleaner, for example to manually increase or decrease the power of the vacuum motor 52. In embodiments, the HCI 64 also comprises an audio output device such as a speaker 67 which can provide audible feedback to the user.

Figure 5A:
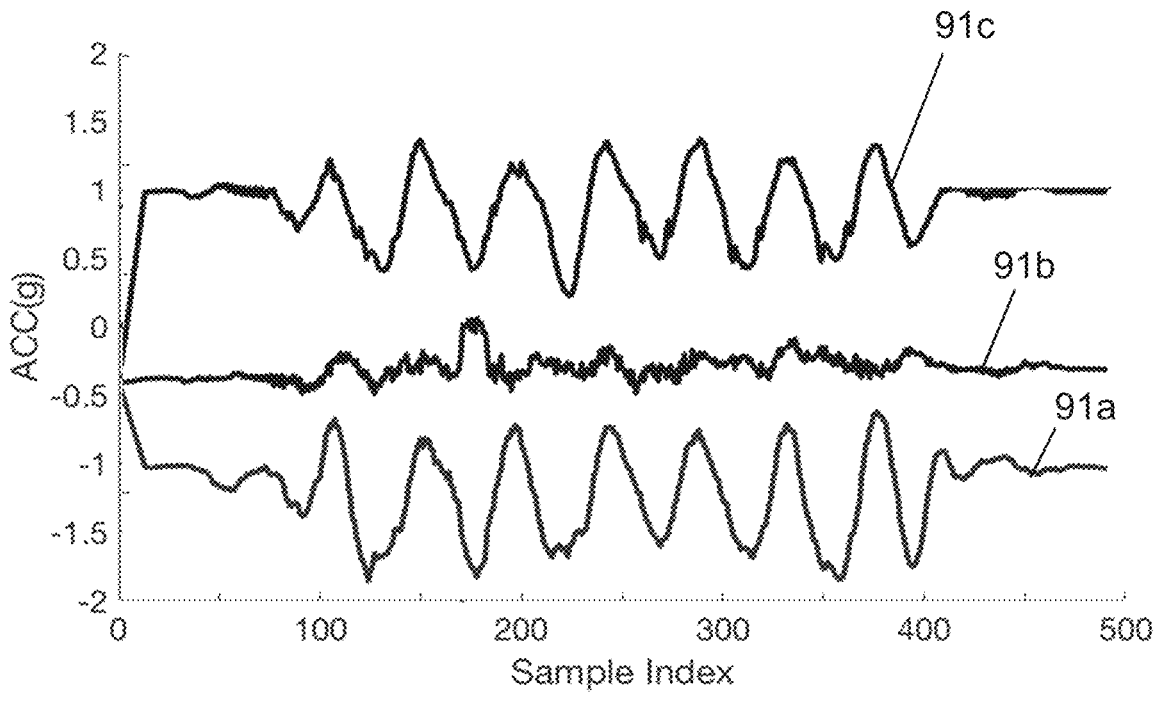
FIGS. 5a and 5b illustrate sensor signals corresponding to linear and angular acceleration generated by an inertial measurement unit of a vacuum cleaner according to embodiments of the present disclosure.
Figure 5B:
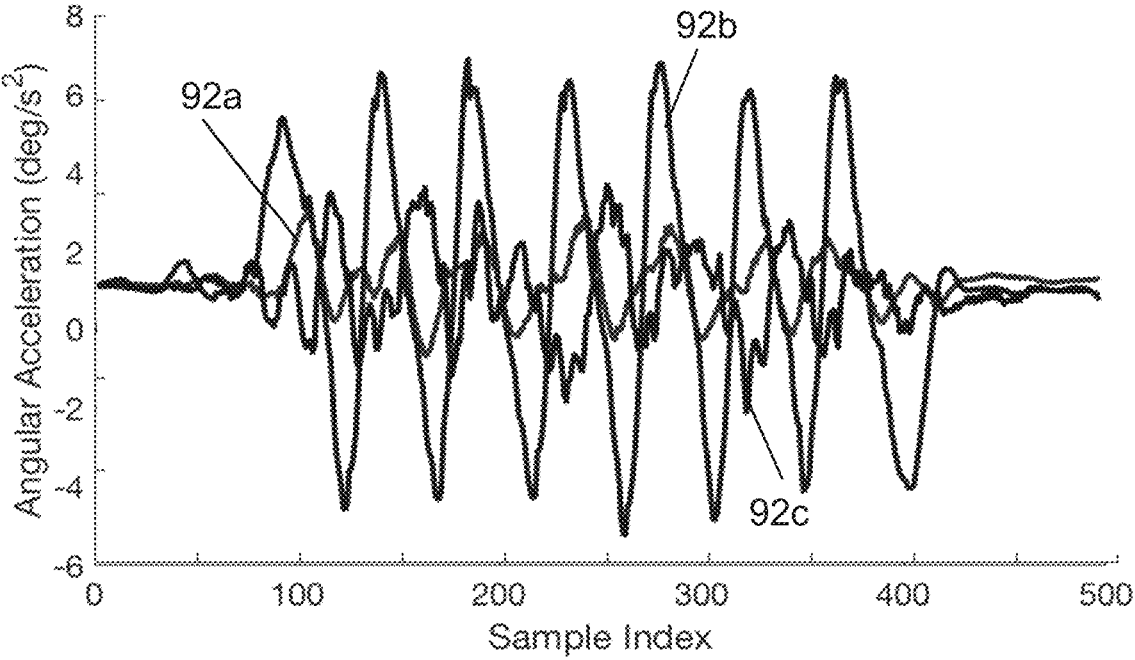
Figure 6:
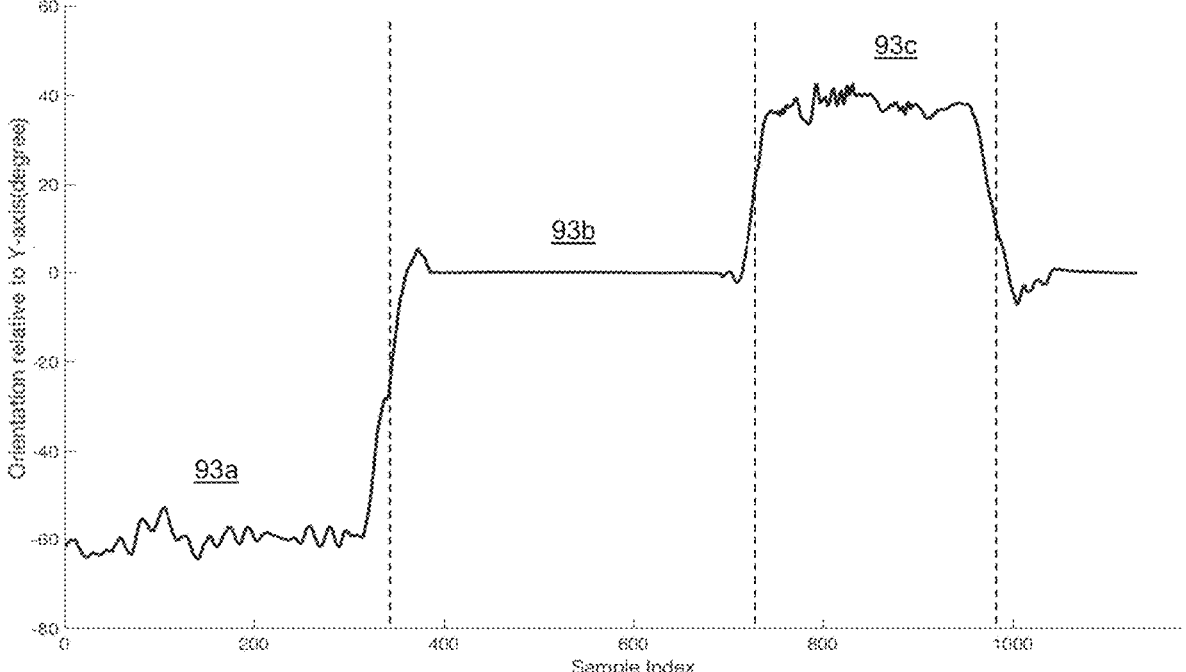
FIGS. 6 and 7 illustrates further sensor signals corresponding to orientation generated by the inertial measurement unit of a vacuum cleaner according to embodiments of the present disclosure.
Figure 7:
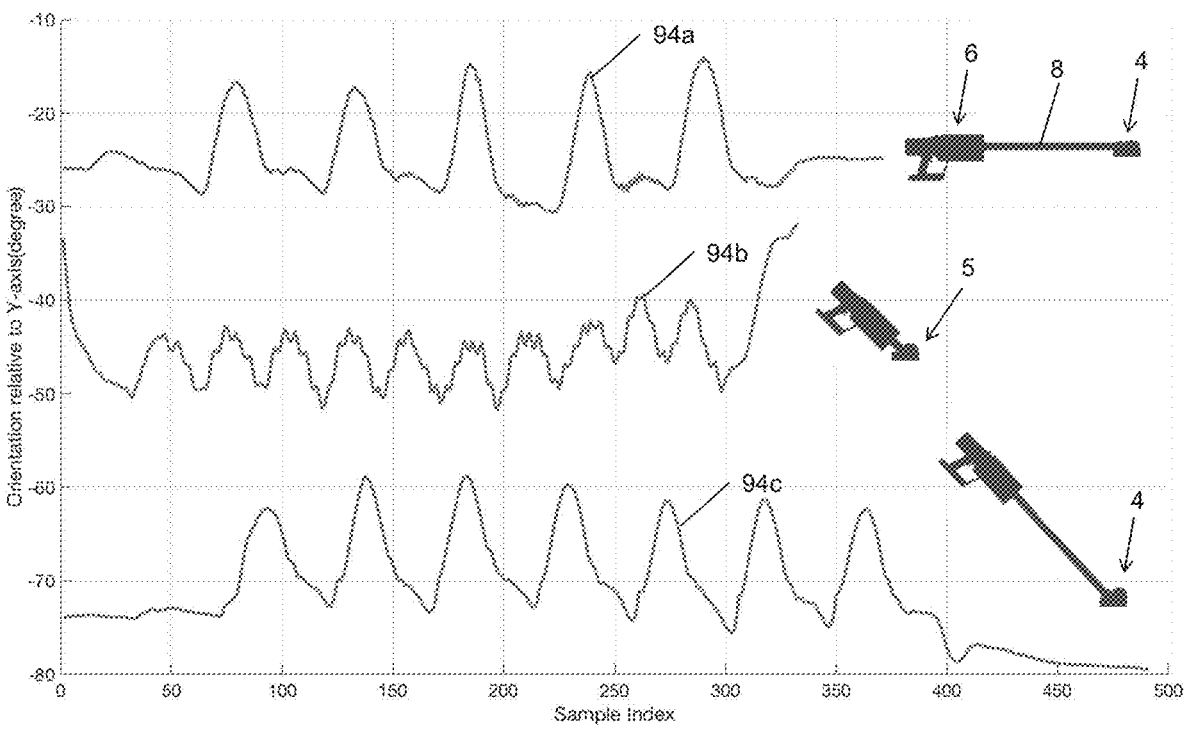

The IMU 62 generates sensor signals dependent on the motion and orientation of the main body 6 of the vacuum cleaner 2 in three spatial dimensions (x, y, and z). The motion includes the linear acceleration and angular acceleration of the main body 6. FIG. 5a illustrates exemplary generated IMU 62 sensor data corresponding to the linear acceleration of the main body 6 before, during and after a cleaning operation. The time scale shows the index of samples which were gathered at a sampling rate of 25 Hz. The vertical scale is in units of acceleration due to gravity. Traces 91a, 91b and 91c correspond to the linear acceleration of the main body 6 in the x, y and z directions respectively. FIG. 5b illustrates exemplary generated IMU 62 sensor data corresponding to the angular acceleration of the main body 6 before, during and after the same cleaning operation as represented in FIG. 5a. Traces 92a, 92b and 92c correspond to the angular acceleration about the x, y and z axes respectively. In both FIGS. 5a and 5b, the vacuum cleaner 2 is initially static (at rest). This is followed by a cleaning session comprising cleaning strokes, giving rise to oscillatory behaviour in some of the generated sensor data. Finally, the vacuum cleaner 2 is again returned to rest. The data shown in FIGS. 5a and 5b have been smoothed, for example by means of a band-pass filter or a low-pass filter. FIG. 6 illustrates example generated IMU 62 sensor data corresponding to of the orientation of the main body 6 about the y axis during different hand-held cleaning operations. Specifically, interval 93a corresponds to cleaning of a low-level surface, e.g. a skirting board, interval 93b corresponds to a period during which the main body 6 is at rest on a table and interval 93c corresponds to cleaning of an elevated surface, for example a ceiling, blind, curtain, or the top of a cupboard. FIG. 7 illustrates further exemplary generated IMU 62 sensor data corresponding to orientation of the main body 6 about the y axis during different cleaning operations using the motorized cleaner heads 4, 5. Trace 94a corresponds to cleaning under furniture using the main cleaner head 4 attached to the wand 8. Trace 94b corresponds to stair cleaning using the miniature motorized cleaner head 5 attached directly to the main body 6, without using the wand 8. Trace 94c corresponds to normal upright vacuum cleaning using the cleaner head 4 attached to the wand 8. It should be appreciated that the different cleaning activities give rise to different signatures in the sensor data generated by the IMU 62. In this manner, it should be appreciated that the IMU 62 sensor data can be processed to infer information about the cleaning activity being performed by a user using the vacuum cleaner, or about the environment in which the vacuum cleaner is being operated.

Figure 8:
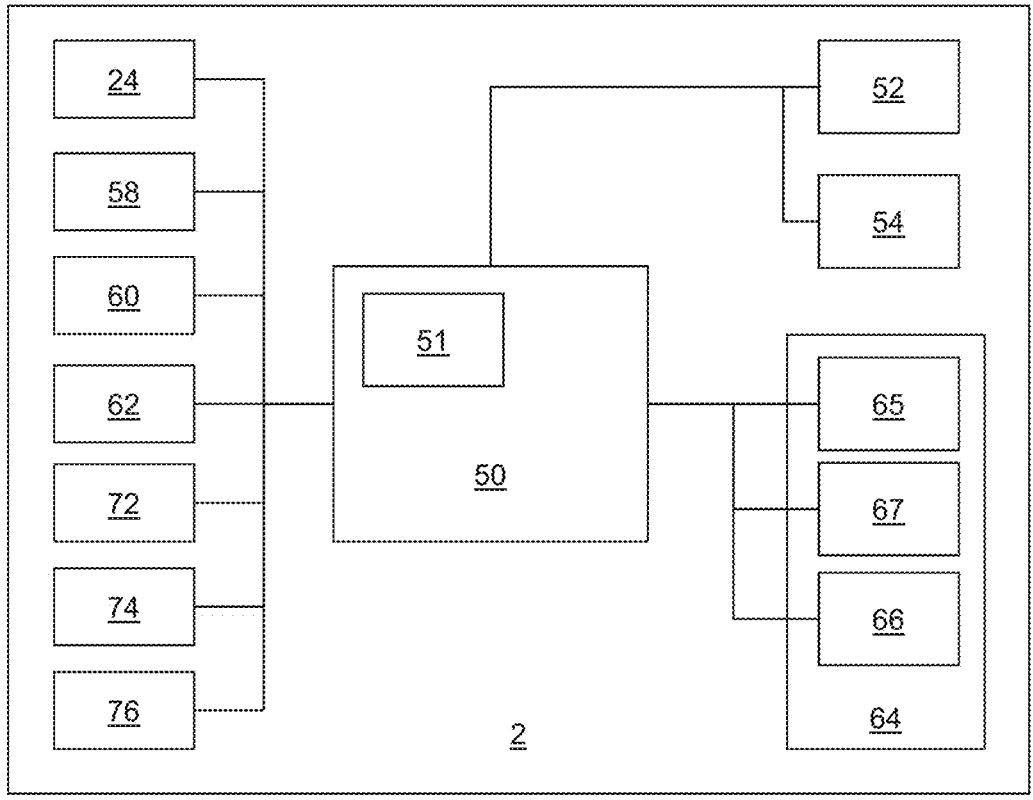
FIG. 8 is a simplified schematic illustration of electrical components of the vacuum cleaner of FIG. 3, showing electrical connections between sensors, a human-computer interface, motors and the controller according to embodiments of the present disclosure.

FIG. 8 illustrates schematically the electrical layout of the vacuum cleaner 2 according to embodiments. In embodiments, the controller 50 receives and processes signals generated by one or more of the trigger 24, the current sensor 58, the pressure sensor 60, the IMU 62, the one or more TOF sensors 72, the tool switch sensor 74 and the capacitive sensor 76. The controller 50 has a memory 51 on which are stored instructions according to which the controller 50 processes the sensor signals. Based on the processing of the sensor signals, the controller 50 controls one or more of the vacuum motor 52, the agitator motor 54 and the HCI 64 in order to enhance operation of the vacuum cleaner 2 and thereby improve the user experience. Example enhancements include improved pickup of dirt and improved battery life, amongst others.

Figure 9:
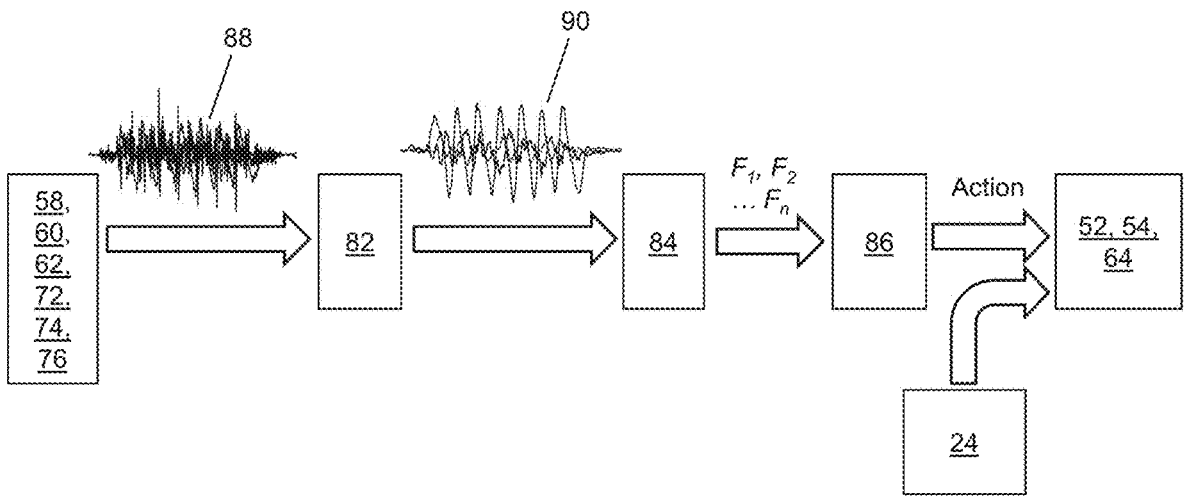
FIG. 9 is a block diagram illustrating example sensor signal processing performed by the controller according to various embodiments of the present disclosure.

FIG. 9 is a block diagram which illustrates example sensor signal processing performed by the controller 50 according to various embodiments of the present disclosure. Unfiltered sensor signals 88 are received at the controller 50 from one or more of the available sensors. Different embodiments utilize sensor signals from different sensors. Some embodiments utilize sensor signals from only one sensor, such as the IMU 62, for example. A band-pass filter or low-pass filter 82 filters the raw sensor signals 88 to generate smoothed sensor signals 90 which are more suitable for further processing. At block 84, pre-determined features $F_1$, $F_2 \ldots F_n$ are extracted from the smoothed sensor signals and subsequently analysed by a classifier 86. In embodiments, the classifier 86 determines, from the extracted features, a particular cleaning activity being performed by a user using the vacuum cleaner 2. In other embodiments, the classifier 86 determines, from the extracted features a particular surface type on which the vacuum cleaner 2 is being operated. In other embodiments, the classifier 86 determines, from the extracted features, whether the vacuum cleaner 2 is actively being used, to assist in providing a trigger-less vacuum cleaner 2. Having determined the above, the controller 50 causes an action or actions to be performed involving one or more of the vacuum motor 52, agitator motor 54 and HCI 64, which are configured in dependence on the classifier 86 output, and optionally on the status of the trigger 24. It should be appreciated that the filter 82, feature extraction block 84 and classifier 86 are in general implemented as software modules which are executed on or under the control of the controller 50. The controller memory 51 stores sets of instructions defining the operation of the filter 82, feature extraction 84, classifier 86 and resultant action. In embodiments, the classifier is based on a machine learning classifier such as an artificial neural network, a random forest, a support-vector machine or any other appropriate trained model. The model could have been pre-trained, for example at the factory, using a supervised learning approach. A sliding window approach is generally used to span the filtered sensor signals and extract features corresponding to that particular time portion of the signal. Consecutive frames usually overlap to some degree but are usually processed separately. It should be appreciated that it is not always necessary to receive and process sensor data from all of the available sensors. For example, in embodiments the controller 50 may process only IMU 62 sensor data to obtain a classifier output. Furthermore, in the case of IMU 62 sensor data, the controller 50 may for example take account only of IMU 62 sensor data relating to orientation of the vacuum cleaner 2, or only IMU 62 sensor data relating to acceleration of the vacuum cleaner 2.

Figure 10:
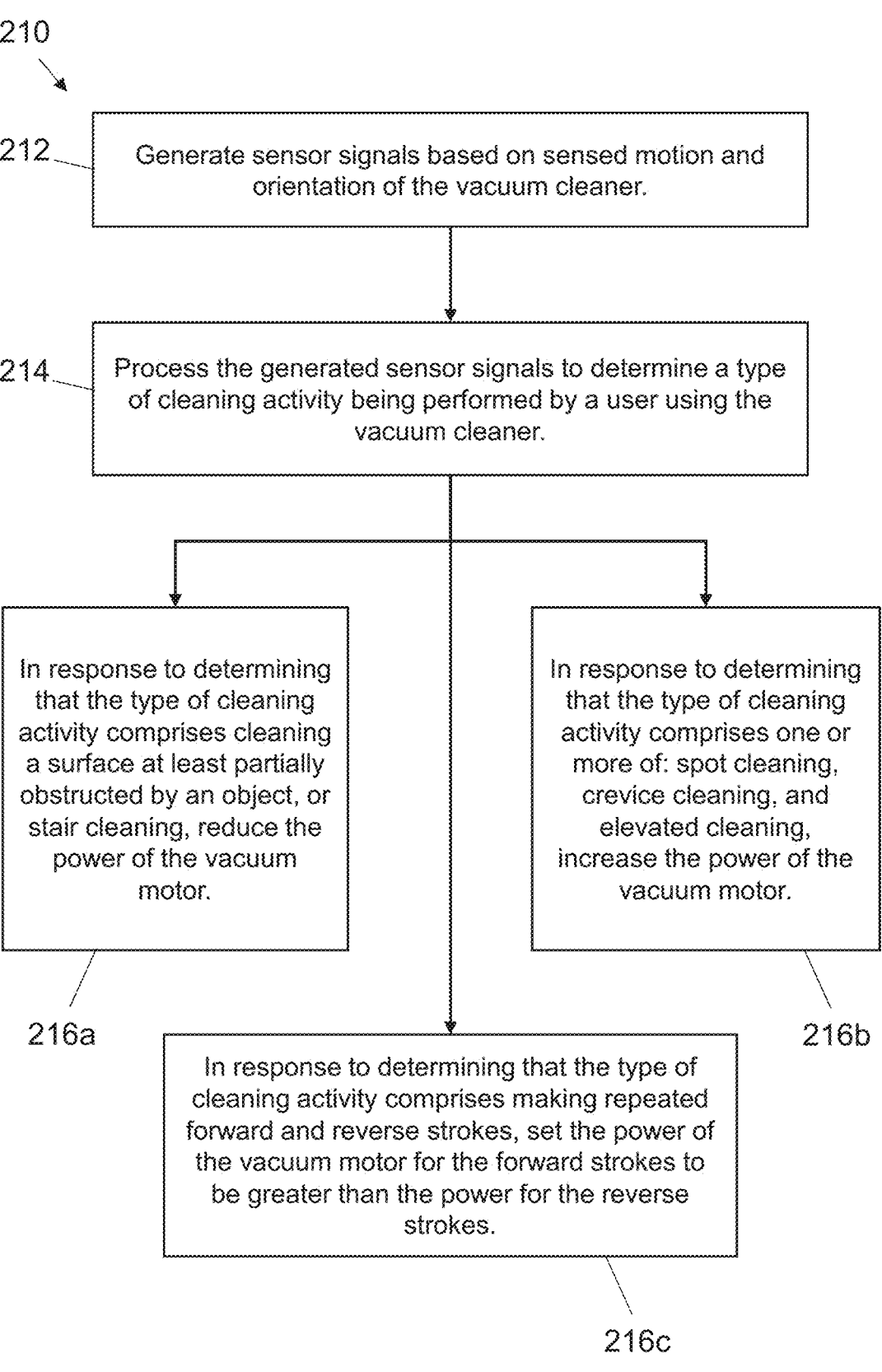
FIG. 10 is a flow diagram showing a method of controlling the power of a vacuum cleaner according to an embodiment of the present disclosure.

FIG. 10 is a flow diagram showing methods 210 of controlling the power of the vacuum cleaner 2 according to embodiments. In step 212, sensor signals based on sensed motion and orientation of the vacuum cleaner are generated, for example by the IMU 62. In step 214, the controller 50 processes generated sensor signals to determine a type of cleaning activity being performed by a user using the vacuum cleaner. In step 216a, in response to determining that the type of cleaning activity comprises cleaning a surface at least partially obstructed by an object, or cleaning stairs, the controller 50 reduces the power of the vacuum motor 52. Alternatively, in step 216b, in response to determining that the type of cleaning activity comprises one or more of: spot cleaning, crevice cleaning, and elevated cleaning, the controller 50 increases the power of the vacuum motor 52. Alternatively, in step 216c, in response to determining that the type of cleaning activity comprises making repeated forward and reverse strokes, the controller 50 sets the power of the vacuum motor 52 for the forward strokes to be greater than the power for the reverse strokes. For example, the controller may set the power of the vacuum motor 52 to a maximum power level for the forward strokes and a minimum power level for the reverse strokes. In some embodiments, the controller 50 may switch the vacuum motor 52 off for the reverse strokes. In embodiments, the controller 50 processes the sensor signals in accordance with the example sensor signal processing described above with reference to FIG. 9.

Figure 11A:
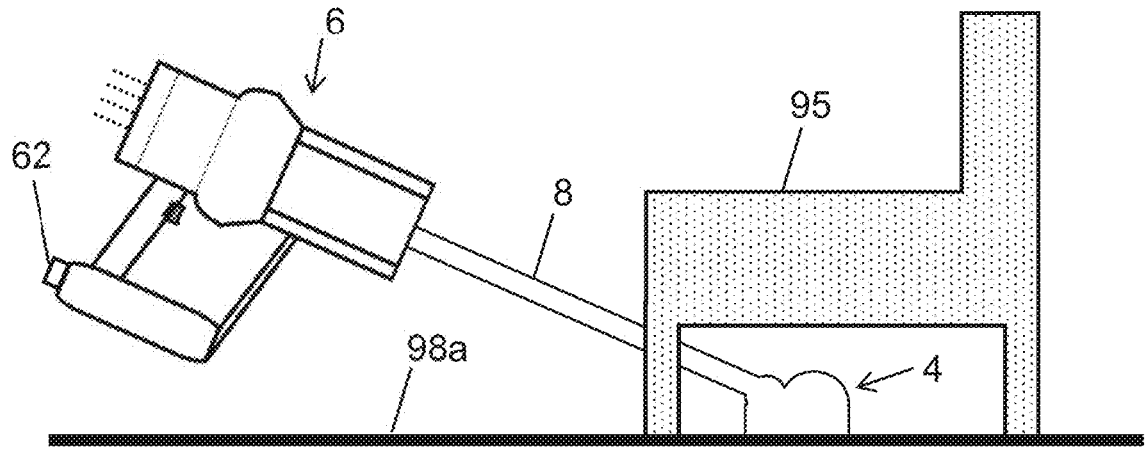
FIGS. 11a-11d illustrate example cleaning activities applicable to the method illustrated in FIG. 10 according to embodiments of the present disclosure.

With reference to FIG. 11a, an example of a surface 98a at least partially obstructed by an object 95 is illustrated. Obstructed by an object generally means that the surface 98a is under or behind the object 95 for example, such that it is not easily accessible for cleaning. The object could be an item of furniture 95 or an appliance, such as a refrigerator or a cooker, for example. In the example of FIG. 11a the object is a chair or sofa. When cleaning such surfaces using the vacuum cleaner 2, the user is typically more constrained in terms of the amount of force they can apply to manoeuvre the vacuum cleaner 2. Accordingly, by reducing the power of the vacuum motor 52 when cleaning such a surface, the suction force between the cleaner head 4 and the surface 98a is reduced which allows the user to manoeuvre the vacuum cleaner 2 with a reduced force, whilst still providing an adequate level of cleaning. The controller 50 may decrease the power of the vacuum motor 52 by setting the power to a value below a pre-determined value, which could be the default operating power of the vacuum motor 52. For example, when the vacuum cleaner 2 is initially switched on, it usually operates at a default power level which is suitable for general cleaning activities. The default power level could be the middle of three power levels: low (eco), medium (default) and high (boost). The reduced power level would therefore be the low or eco power setting.

Figure 11B:
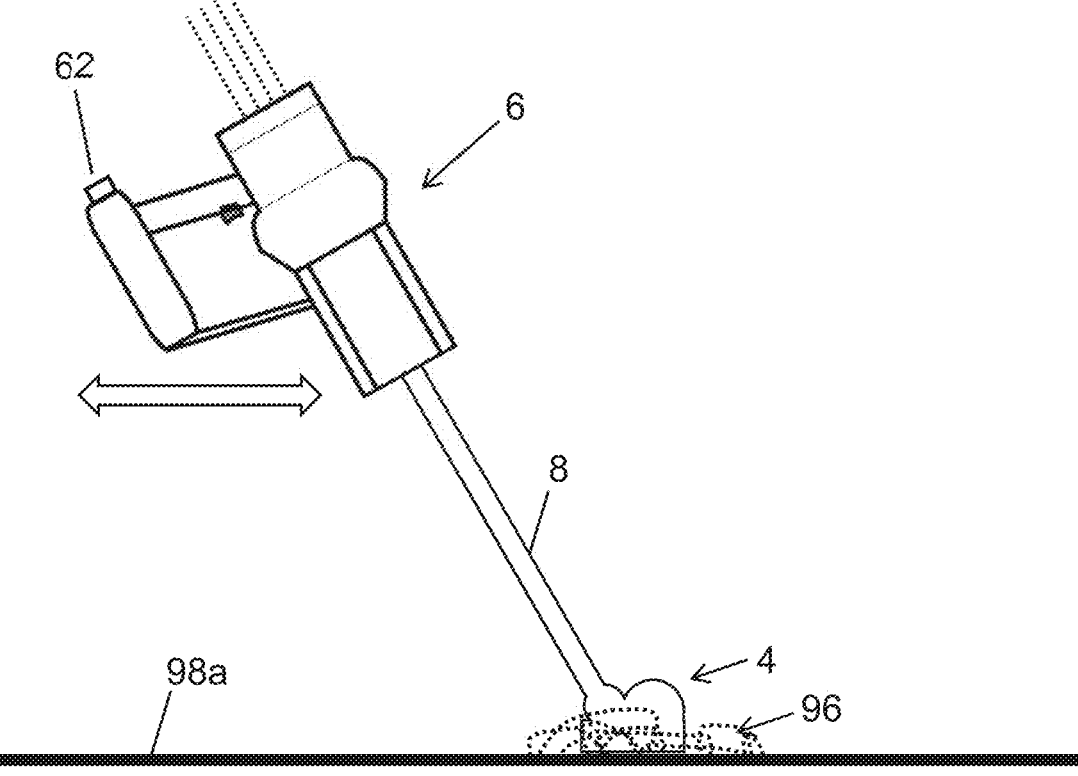
Figures 11C, 11D:
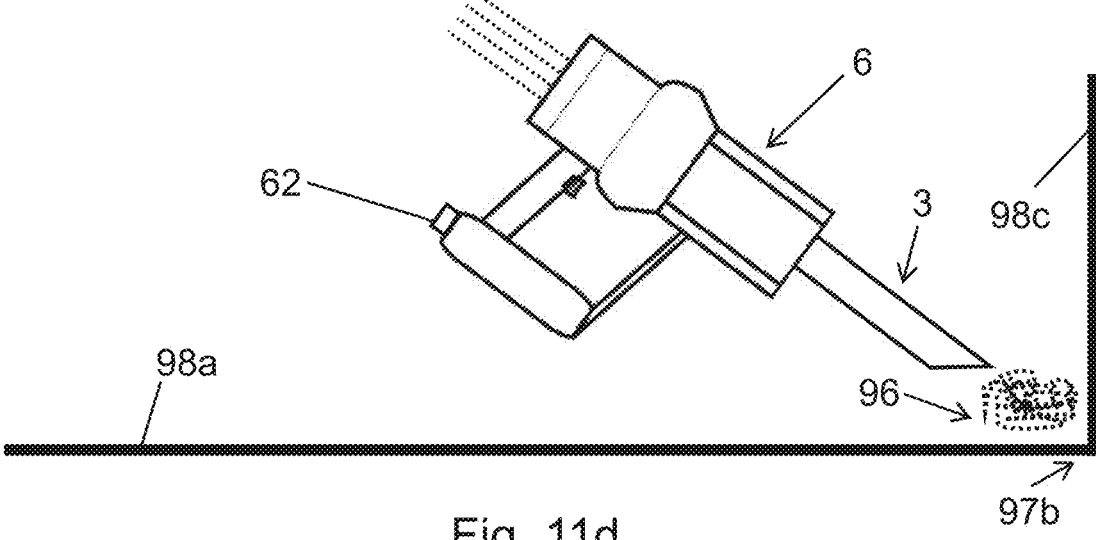

FIG. 11b illustrates cleaning of stubborn dirt 96 in a manner corresponding to spot cleaning of the surface 98a. When spot cleaning, the user will typically make repeated, short forward and backward strokes over the area containing the dirt in order to completely remove all of the dirt. Such repeated short strokes will produce particular IMU 62 signals allowing the controller 50 to determine that the cleaning activity corresponds to spot cleaning. The controller 50 may increase the power of the vacuum motor 52 by setting the power to a value above a pre-determined value (which could be the default operating power of the vacuum motor 52). The increased power level would therefore be the high or boost power setting. FIG. 11c illustrates elevated cleaning of dirt 96 on a surface above a head height of the user, which in this example is a ceiling 98b and a cornice 97a where the wall 98c meets the ceiling 98b. Elevated cleaning may also involve the cleaning of a window blind or a curtain, for example. In FIG. 11c the vacuum cleaner 2 is being used with the crevice tool 3 attached to the wand 8. The orientation, which is sensed by the IMU 62, allows the controller 50 to determine that the cleaning activity corresponds to elevated cleaning. FIG. 11d illustrates cleaning of a crevice 97b formed between the floor surface 98a and the wall 98c. In this example, the vacuum cleaner 2 is being used with the crevice tool 3 attached directly to the main body 6.

It is to be understood that any feature described in relation to any one embodiment and/or aspect may be used alone, or in combination with other features described, and may also be used in combination with one or more features of any other of the embodiments and/or aspects, or any combination of any other of the embodiments and/or aspects.

In embodiments of the present disclosure, the vacuum cleaner 2 comprises a controller 50. The controller 50 is configured to perform various methods described herein. In embodiments, the controller comprises a processing system. Such a processing system may comprise one or more processors and/or memory. Each device, component, or function as described in relation to any of the examples described herein, for example the IMU 62 and/or HCI 64 may similarly comprise a processor or may be comprised in apparatus comprising a processor. One or more aspects of the embodiments described herein comprise processes performed by apparatus. In some examples, the apparatus comprises one or more processors configured to carry out these processes. In this regard, embodiments may be implemented at least in part by computer software stored in (non-transitory) memory and executable by the processor, or by hardware, or by a combination of tangibly stored software and hardware (and tangibly stored firmware). Embodiments also extend to computer programs, particularly computer programs on or in a carrier, adapted for putting the above described embodiments into practice. The program may be in the form of non-transitory source code, object code, or in any other non-transitory form suitable for use in the implementation of processes according to embodiments. The carrier may be any entity or device capable of carrying the program, such as a RAM, a ROM, or an optical memory device, etc.

The one or more processors of processing systems may comprise a central processing unit (CPU). The one or more processors may comprise a graphics processing unit (GPU). The one or more processors may comprise one or more of a field programmable gate array (FPGA), a programmable logic device (PLD), or a complex programmable logic device (CPLD). The one or more processors may comprise an application specific integrated circuit (ASIC). It will be appreciated by the skilled person that many other types of device, in addition to the examples provided, may be used to provide the one or more processors. The one or more processors may comprise multiple co-located processors or multiple disparately located processors. Operations performed by the one or more processors may be carried out by one or more of hardware, firmware, and software. It will be appreciated that processing systems may comprise more, fewer and/or different components from those described.

The techniques described herein may be implemented in software or hardware, or may be implemented using a combination of software and hardware. They may include configuring an apparatus to carry out and/or support any or all of techniques described herein. Although at least some aspects of the examples described herein with reference to the drawings comprise computer processes performed in processing systems or processors, examples described herein also extend to computer programs, for example computer programs on or in a carrier, adapted for putting the examples into practice. The carrier may be any entity or device capable of carrying the program. The carrier may comprise a computer readable storage media. Examples of tangible computer-readable storage media include, but are not limited to, an optical medium (e.g., CD-ROM, DVD-ROM or Blu-ray), flash memory card, floppy or hard disk or any other medium capable of storing computer-readable instructions such as firmware or microcode in at least one ROM or RAM or Programmable ROM (PROM) chips.

Where in the foregoing description, integers or elements are mentioned which have known, obvious or foreseeable equivalents, then such equivalents are herein incorporated as if individually set forth. Reference should be made to the claims for determining the true scope of the present disclosure, which should be construed so as to encompass any such equivalents. It will also be appreciated by the reader that integers or features of the present disclosure that are described as preferable, advantageous, convenient or the like are optional and do not limit the scope of the independent claims. Moreover, it is to be understood that such optional integers or features, whilst of possible benefit in some embodiments of the present disclosure, may not be desirable, and may therefore be absent, in other embodiments.

The invention claimed is:

1. A vacuum cleaner comprising:
a sensor configured to generate sensor signals based on sensed motion and orientation of the vacuum cleaner;
a vacuum motor; and
a controller configured to:
process the generated sensor signals to determine a type of cleaning activity being performed by a user using the vacuum cleaner; and
in response to determining that the type of cleaning activity comprises cleaning a surface at least partially obstructed by an object, decrease the power of the vacuum motor.

2. The vacuum cleaner of claim 1, wherein the surface at least partially obstructed by an object comprises a surface under or behind the object.

3. The vacuum cleaner of claim 1, wherein the object comprises an item of furniture or an appliance.

4. The vacuum cleaner of claim 1, wherein the controller is configured to decrease the power of the vacuum motor by setting the power of the vacuum motor to a value less than a pre-determined value.

5. The vacuum cleaner of claim 4, wherein the pre-determined value corresponds to a default power of the vacuum motor.

6. The vacuum cleaner of claim 5, wherein the controller is configured to set the power of the vacuum motor to the default power when the vacuum cleaner is initially switched on.

7. The vacuum cleaner of claim 1, wherein the sensor signals are based only on sensed motion of the vacuum cleaner or only on sensed orientation of the vacuum cleaner.

8. The vacuum cleaner of claim 1, wherein the sensor comprises an inertial measurement unit, IMU.

9. The vacuum cleaner of claim 1, further comprising:
a cleaner head comprising an agitator; and
one or more diagnostic sensors configured to generate further sensor signals based on sensed parameters of the cleaner head,
wherein the controller is configured to process the generated further sensor signals to determine the type of cleaning activity being performed by the user using the vacuum cleaner.

10. The vacuum cleaner of claim 9,
wherein the cleaner head further comprises an agitator motor arranged to rotate the agitator, and
wherein the sensed parameters of the cleaner head comprise the agitator motor current.

11. The vacuum cleaner of claim 9, wherein the sensed parameters of the cleaner head comprise the pressure applied to the cleaner head.

12. The vacuum cleaner of claim 1, wherein the controller is configured to process the sensor signals by performing a pre-processing step and a classification step.

13. The vacuum cleaner of claim 12, wherein the pre-processing step comprises extracting features from time portions of the sensor signals.

14. The vacuum cleaner of claim 13, wherein the classification step comprises processing the extracted features using a machine learning Classifier stored as a program on a non-transient media.

15. The vacuum cleaner of claim 14, wherein the machine learning classifier, comprising the program stored on the non-transient media, comprises one or more of: an artificial neural network, a random forest and a support-vector machine.

16. The vacuum cleaner of claim 12, wherein the pre-processing step comprises filtering the sensor signals.

17. A vacuum cleaner comprising:
   a sensor configured to generate sensor signals based on sensed motion and orientation of the vacuum cleaner;
   a vacuum motor; and
   a controller configured to:
   process the generated sensor signals to determine a type of cleaning activity being performed by a user using the vacuum cleaner; and
   in response to determining that the type of cleaning activity comprises stair cleaning, decrease the power of the vacuum motor.

18. A method of controlling the power of a vacuum cleaner, the method comprising:
   generating sensor signals based on sensed motion and orientation of the vacuum cleaner;
   processing the sensor signals to determine a type of cleaning activity being performed by a user using the vacuum cleaner; and
   in response to determining that the type of cleaning activity comprises cleaning a surface at least partially obstructed by an object, decreasing the power of the vacuum cleaner.

19. A method of controlling the power of a vacuum cleaner, the method comprising:
   generating sensor signals based on sensed motion and orientation of the vacuum cleaner;
   processing the sensor signals to determine a type of cleaning activity being performed by a user using the vacuum cleaner; and
   in response to determining that the type of cleaning activity comprises stair cleaning, decreasing the power of the vacuum cleaner.

20. A computer program stored on a non-transient media, the computer program comprising a set of instructions, which, when executed by a computerised device, cause the computerised device to perform a method of controlling the power of a vacuum cleaner, the method comprising:
   generating sensor signals based on sensed motion and orientation of the vacuum cleaner;
   processing the sensor signals to determine a type of cleaning activity being performed by a user using the vacuum cleaner; and
   in response to determining that the type of cleaning activity comprises cleaning a surface at least partially obstructed by an object, decreasing the power of the vacuum cleaner.

21. A computer program stored on a non-transient media, the computer program comprising a set of instructions, which, when executed by a computerised device, cause the computerised device to perform a method of controlling the power of a vacuum cleaner, the method comprising:
   generating sensor signals based on sensed motion and orientation of the vacuum cleaner;
   processing the sensor signals to determine a type of cleaning activity being performed by a user using the vacuum cleaner; and
   in response to determining that the type of cleaning activity comprises stair cleaning, decreasing the power of the vacuum cleaner.

* * * * *